(12) United States Patent
Vachon et al.

(10) Patent No.: US 8,086,479 B2
(45) Date of Patent: Dec. 27, 2011

(54) OILFIELD MANAGEMENT SYSTEM AND METHOD

(75) Inventors: Juliani Vachon, Houston, TX (US); Kerry James Huguet, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1366 days.

(21) Appl. No.: 11/669,915

(22) Filed: Jan. 31, 2007

(65) Prior Publication Data

US 2008/0162248 A1 Jul. 3, 2008

Related U.S. Application Data

(60) Provisional application No. 60/882,860, filed on Dec. 29, 2006.

(51) Int. Cl.
*G06F 17/50* (2006.01)
(52) U.S. Cl. ...................................................... 705/7.27
(58) Field of Classification Search .................. 705/8, 9, 705/7.27
See application file for complete search history.

(56) References Cited

U.S. PATENT DOCUMENTS

| | | | |
|---|---|---|---|
| 6,519,568 B1 * | 2/2003 | Harvey et al. ................... 705/1.1 |
| 6,732,145 B1 * | 5/2004 | Aravamudan et al. ........ 709/204 |
| 7,451,403 B1 * | 11/2008 | Srinivasan et al. ............. 715/763 |
| 7,881,535 B1 * | 2/2011 | McLaughlin et al. ........ 382/186 |
| 2002/0099679 A1 * | 7/2002 | Usitalo et al. .................... 706/46 |
| 2002/0184610 A1 * | 12/2002 | Chong et al. ................... 717/109 |
| 2004/0119752 A1 * | 6/2004 | Beringer et al. ............. 345/779 |
| 2004/0122853 A1 * | 6/2004 | Moore ....................... 707/103 R |
| 2005/0209912 A1 * | 9/2005 | Veeningen et al. ............. 705/11 |
| 2006/0074735 A1 * | 4/2006 | Shukla et al. ..................... 705/8 |
| 2006/0085245 A1 * | 4/2006 | Takatsuka et al. ................ 705/9 |
| 2007/0005692 A1 * | 1/2007 | Gist et al. ....................... 709/204 |
| 2007/0006152 A1 * | 1/2007 | Ahmed et al. ................ 717/122 |
| 2007/0168913 A1 * | 7/2007 | Sarukkai et al. .............. 717/101 |
| 2007/0282660 A1 * | 12/2007 | Forth ................................ 705/9 |
| 2007/0283321 A1 * | 12/2007 | Hegde et al. .................. 717/110 |
| 2008/0147453 A1 * | 6/2008 | Kogan et al. ....................... 705/7 |

OTHER PUBLICATIONS

Wang et al., "An Agent-Based Web Service Workflow Model for Inter-Enterprise Collaboration." Expert Systems with Applications, 31 (2006) 787-799.*
"Windows Workflow Foundation Overview," Copyright 2007 by Microsoft Corpofation. [pp. 1 of 1 online]. Retrieved Feb. 26, 2007. Retrieved from the Internet: URL: http://www.msdn2.microsoft.com/en-us/netframework/aa663340(d=printer).aspx.
"Ocean—Technical Specifications," Copyright 2006 by Schlumberger. Produced by Schlumberger Marketing Communications. [pp. 1 of 2]. Retrieved Feb. 26, 2007. Retrieved from the Internet: URL: http://www.sbl.com/sis.

* cited by examiner

*Primary Examiner* — Susanna M Meinecke Diaz

(57) ABSTRACT

Systems and methods for managing and performing oilfield operations for an oilfield having geological formations and reservoirs therein are disclosed. The systems and methods provide a graphical user interface that allows a user to graphically define, edit, and automatically run a workflow for managing and performing oilfield operations. Lines are used in the workflow to express both execution flow and data flow. In this way, both execution flow and data flow may be represented in a single workflow diagram. The workflow management systems and methods also allow users to dynamically modify the workflow to add contact information for one or more other users to at least one work step. Users may then use the workflow management systems and methods to suspend running of the workflow at any modified work step and request consultation, collaboration, and/or approval from the other users whose contact information was added to the work step.

25 Claims, 16 Drawing Sheets

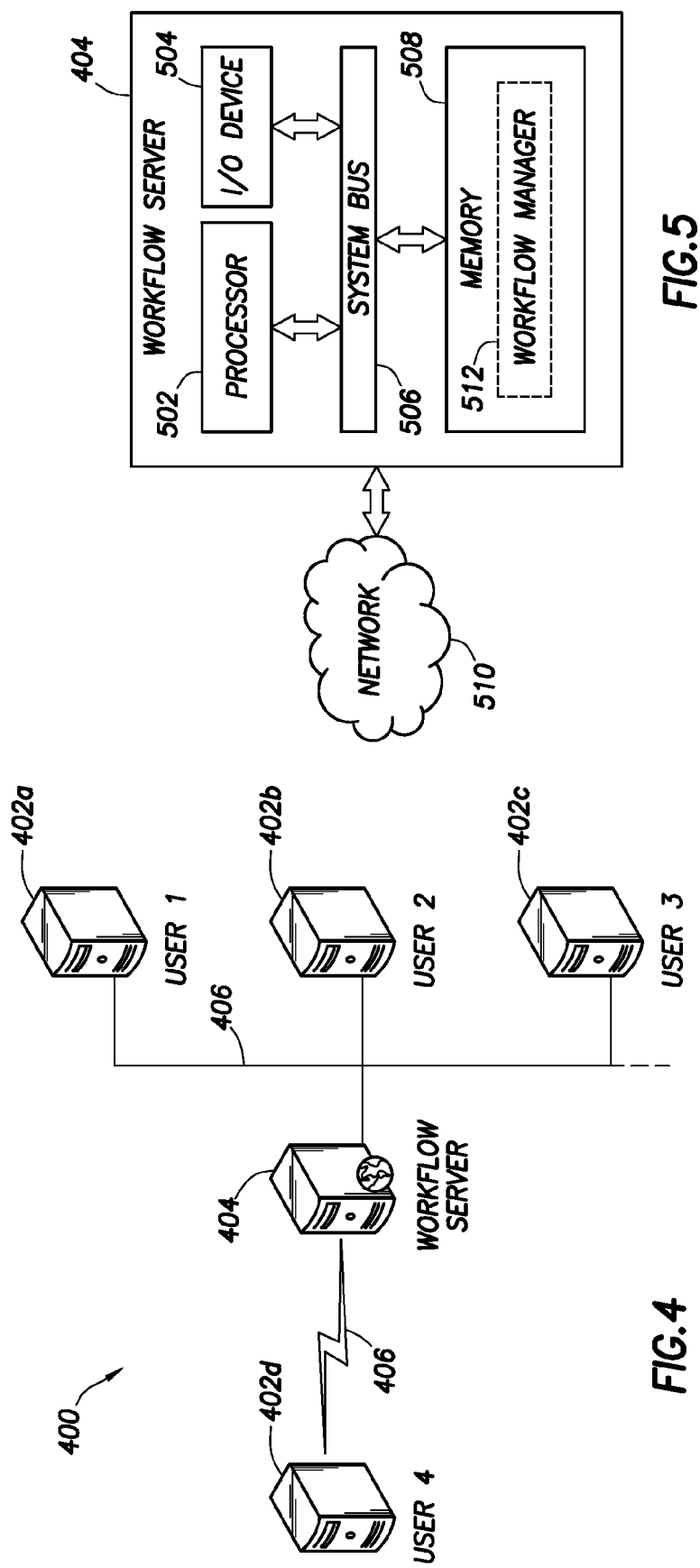

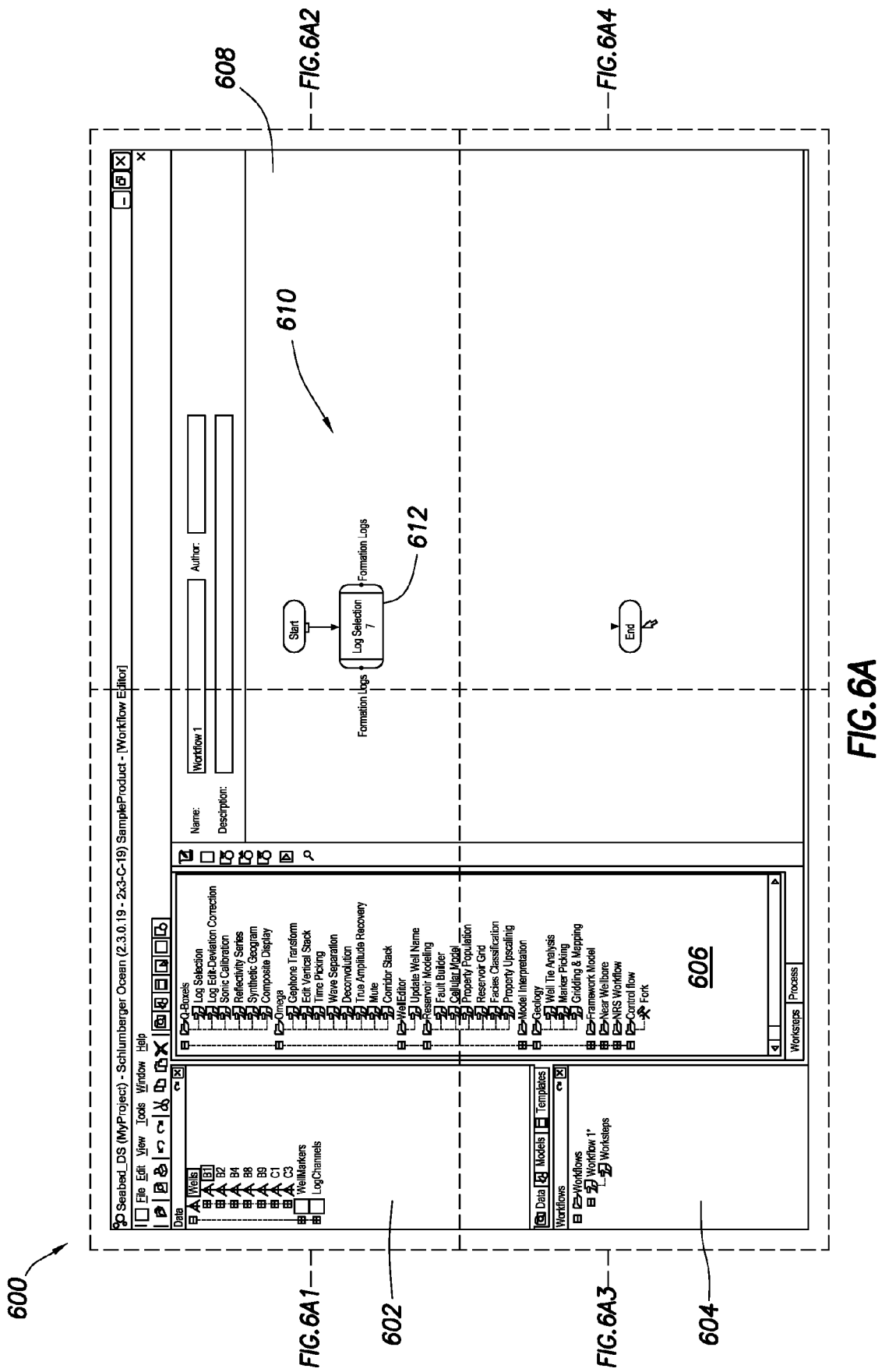

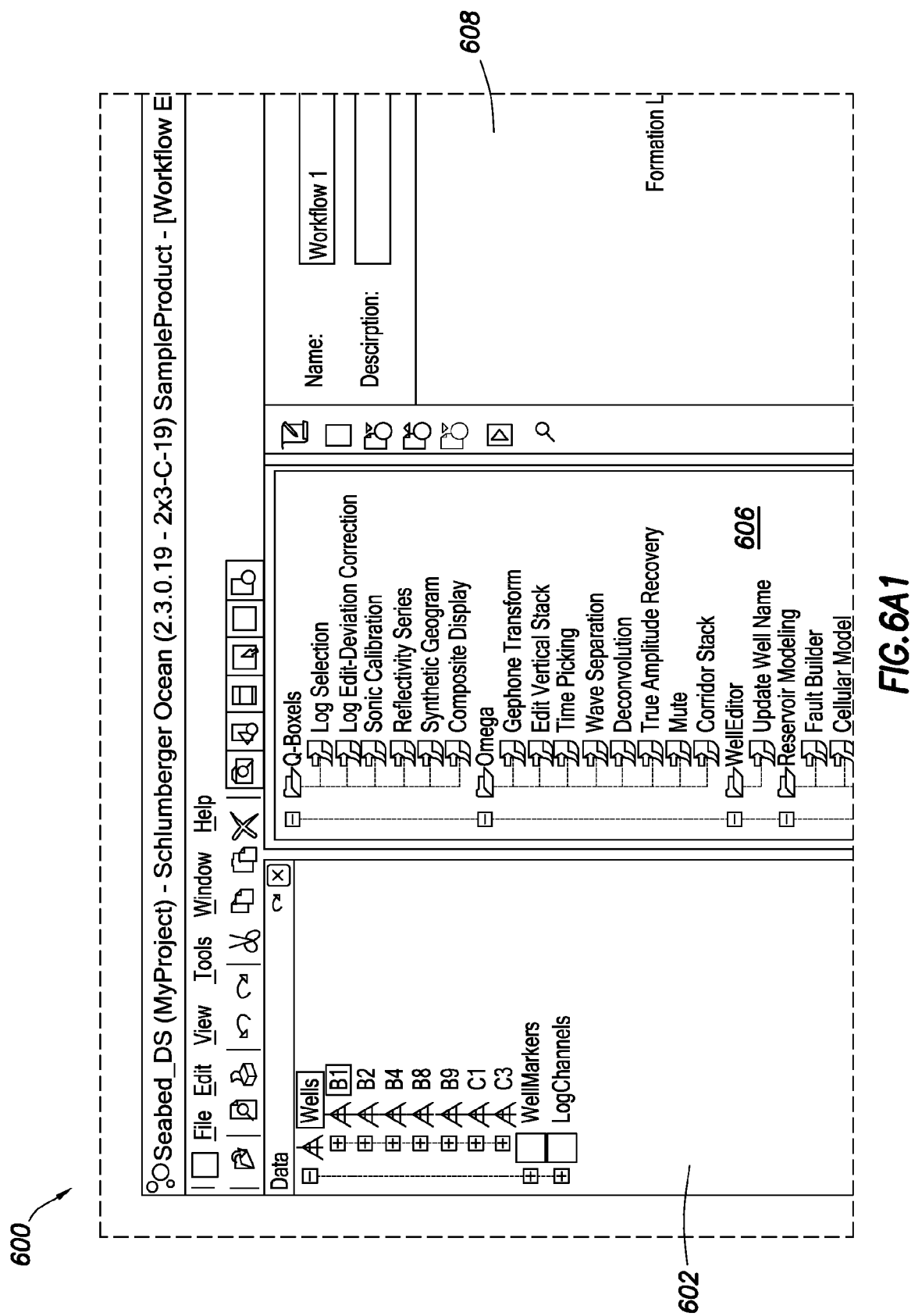
FIG.6A1

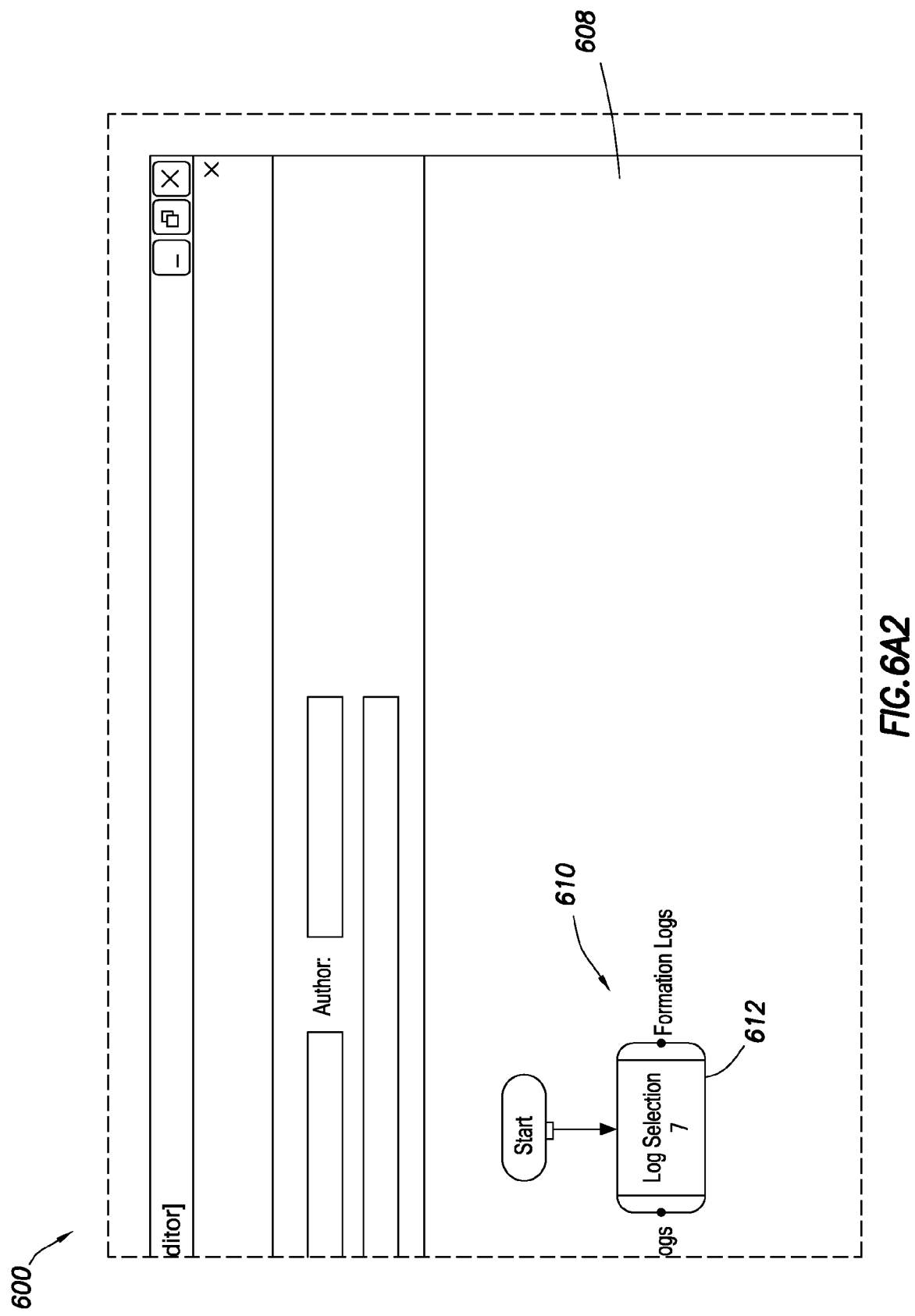
FIG. 6A2

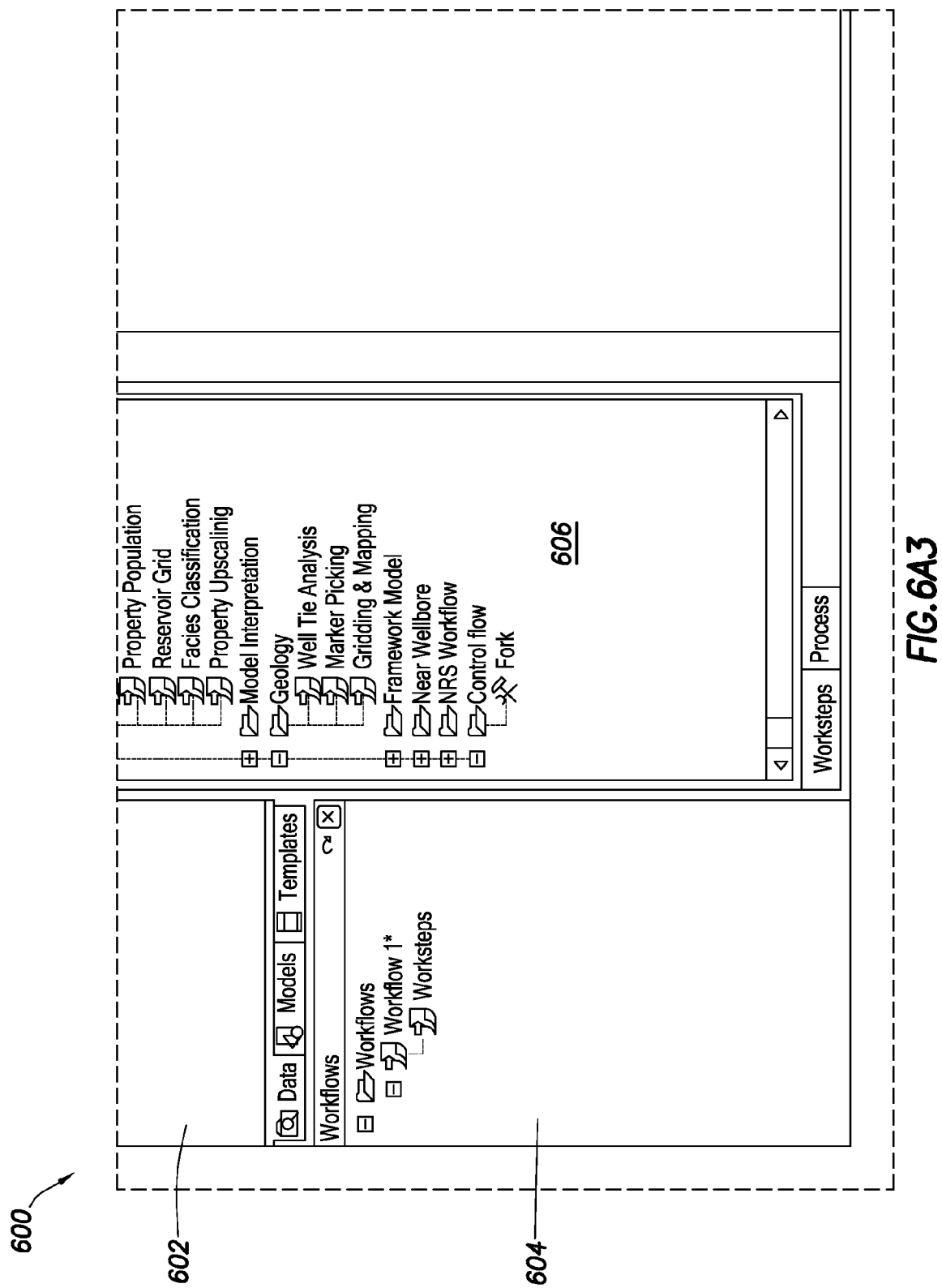
FIG.6A3

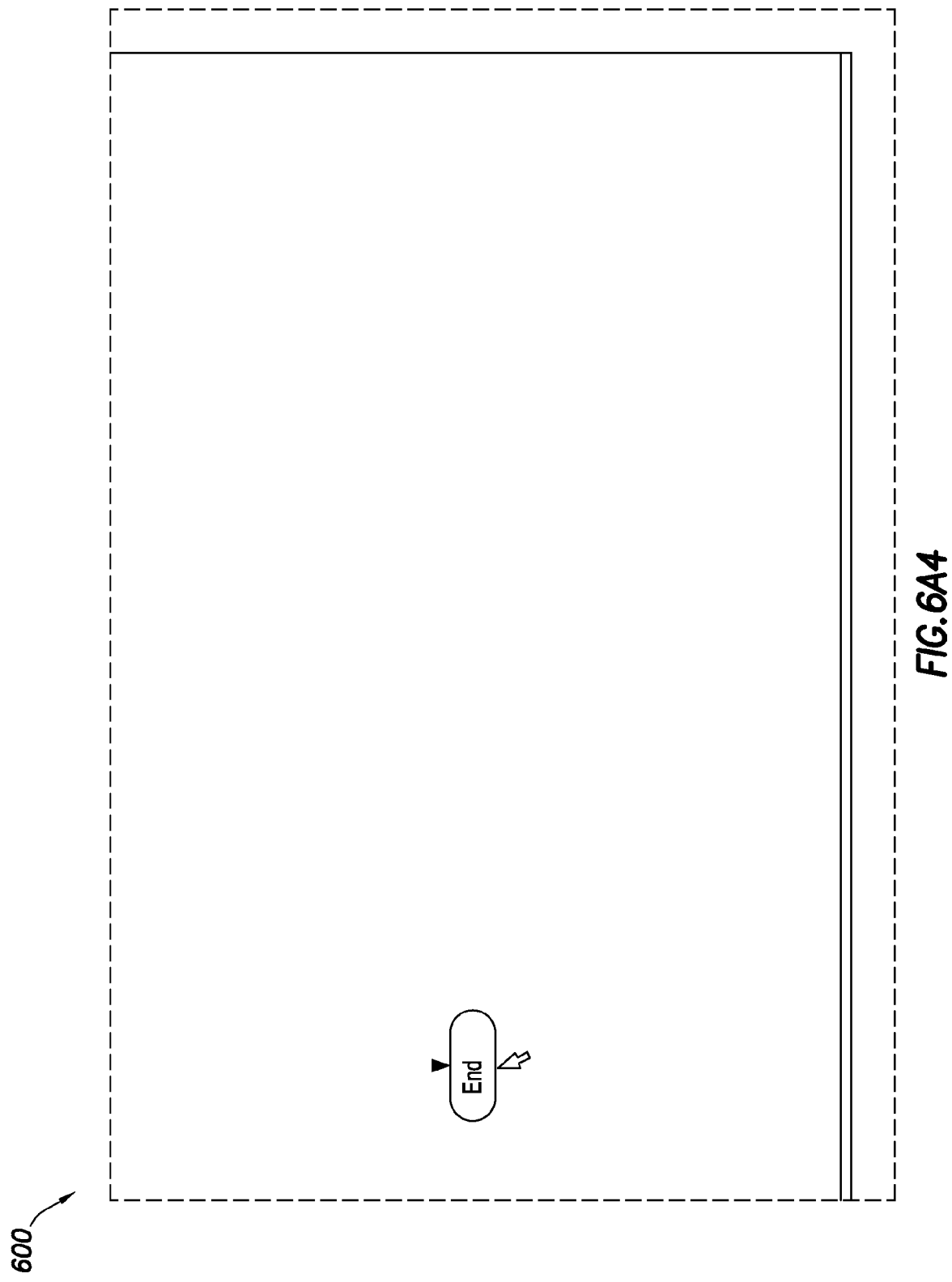
FIG.6A4

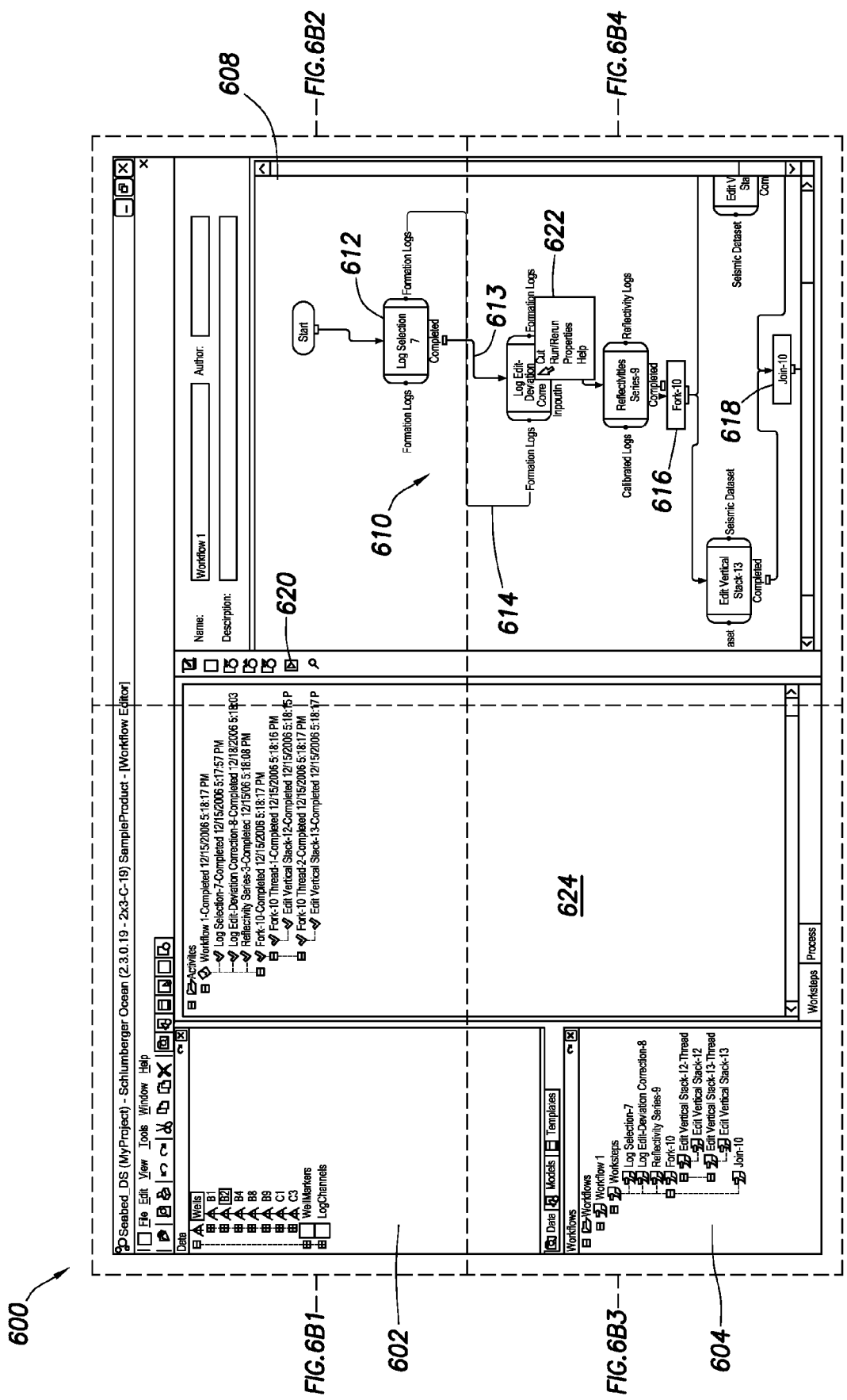

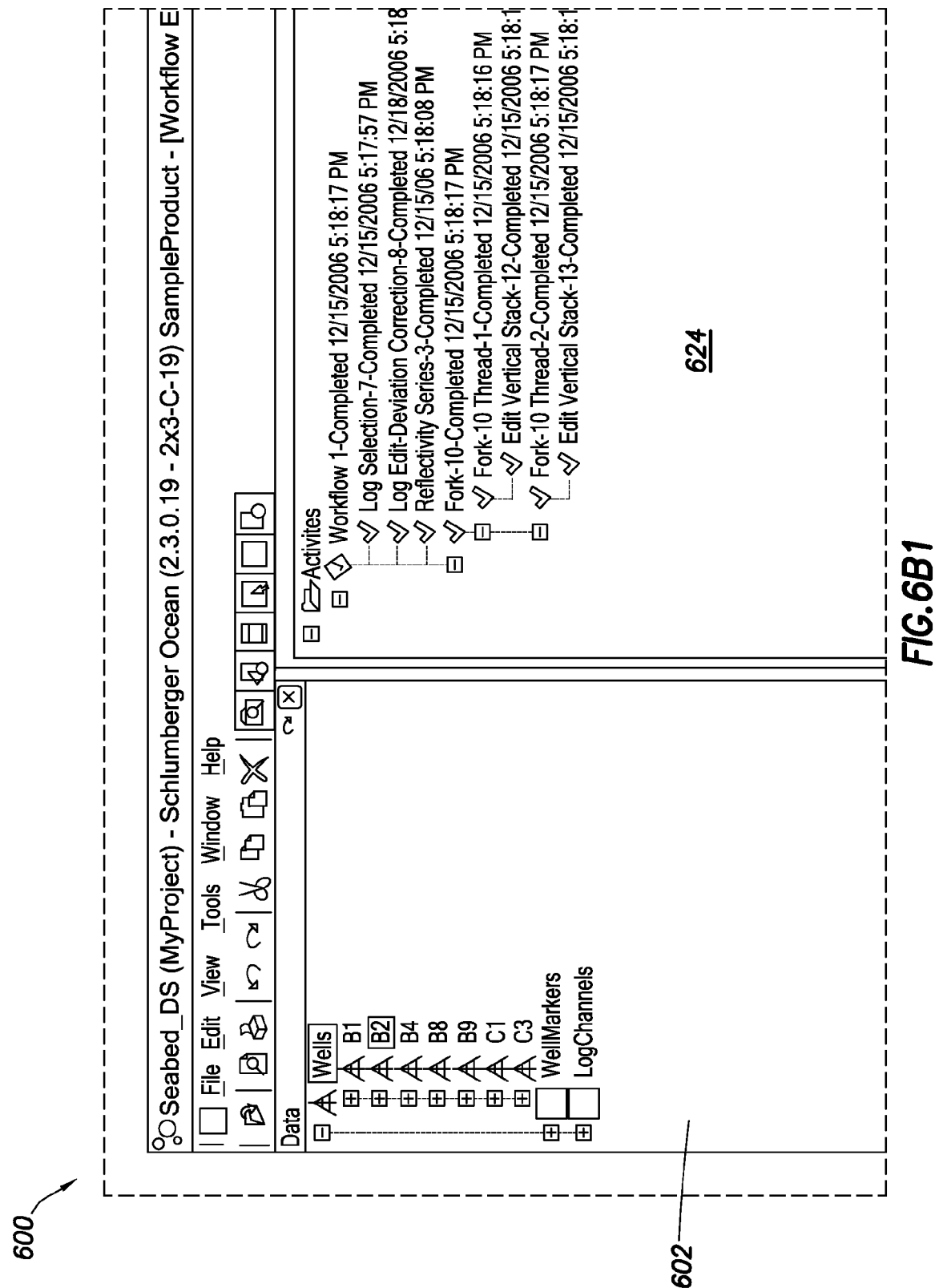
FIG.6B1

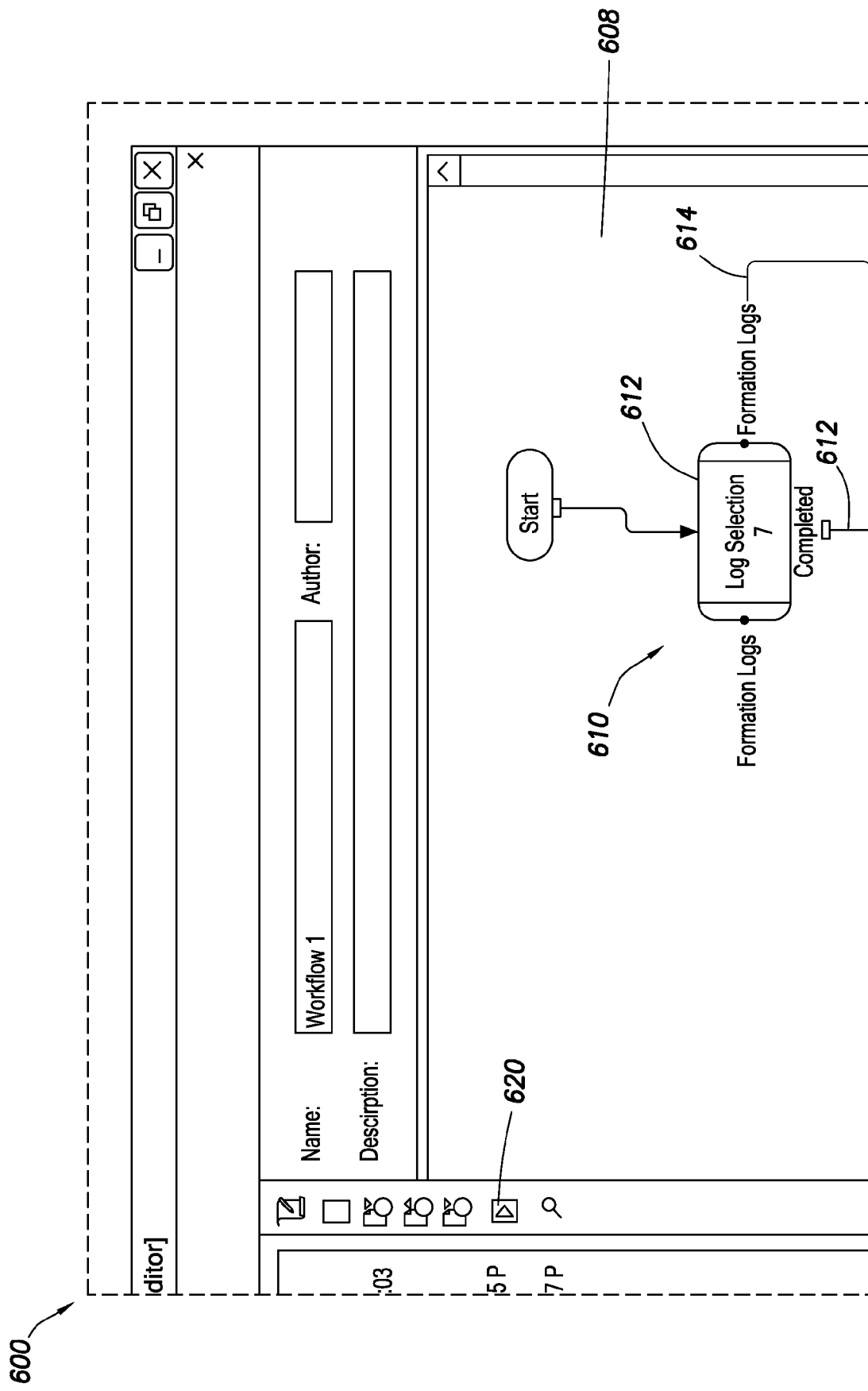
FIG.6B2

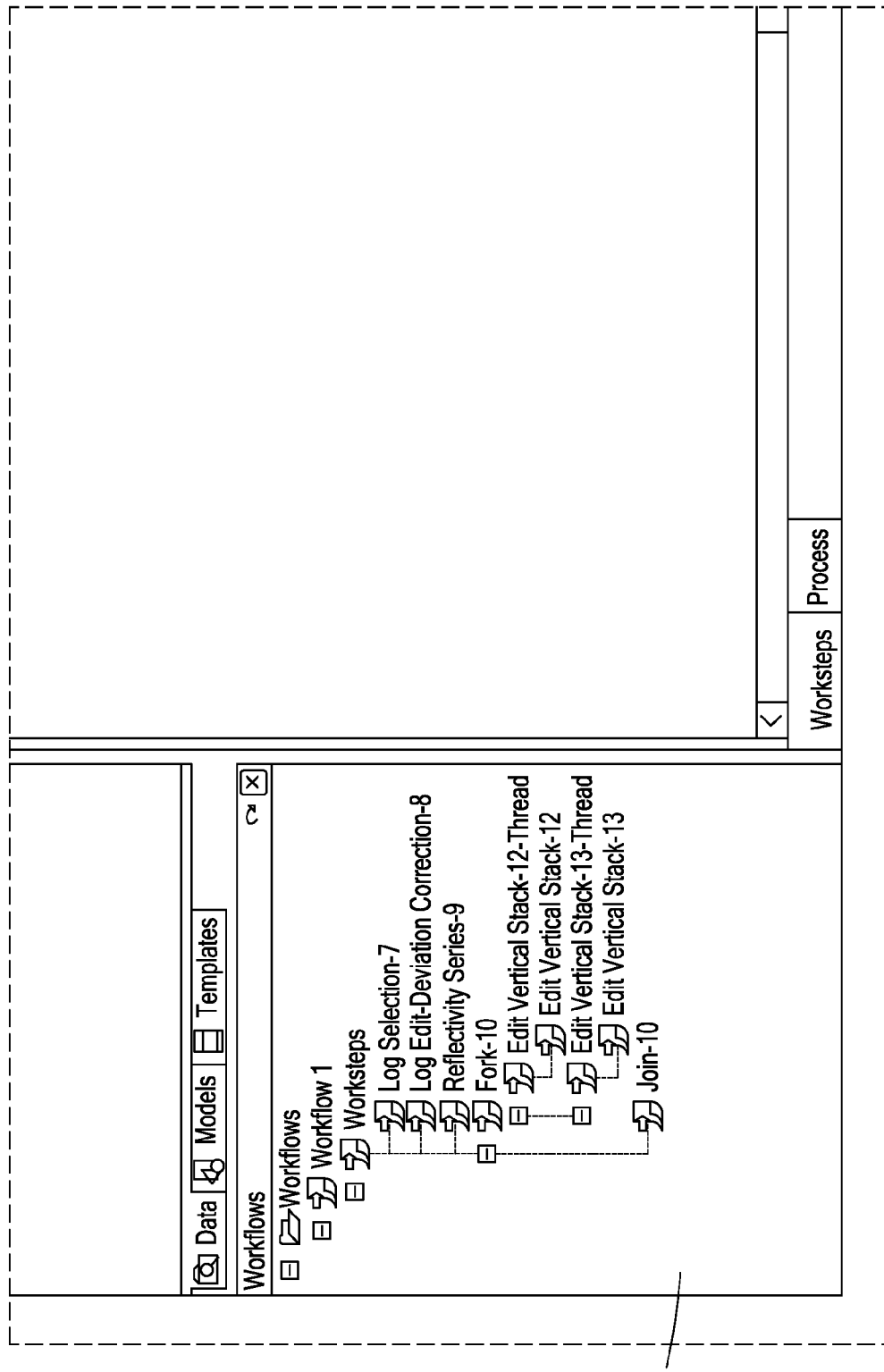
FIG.6B3

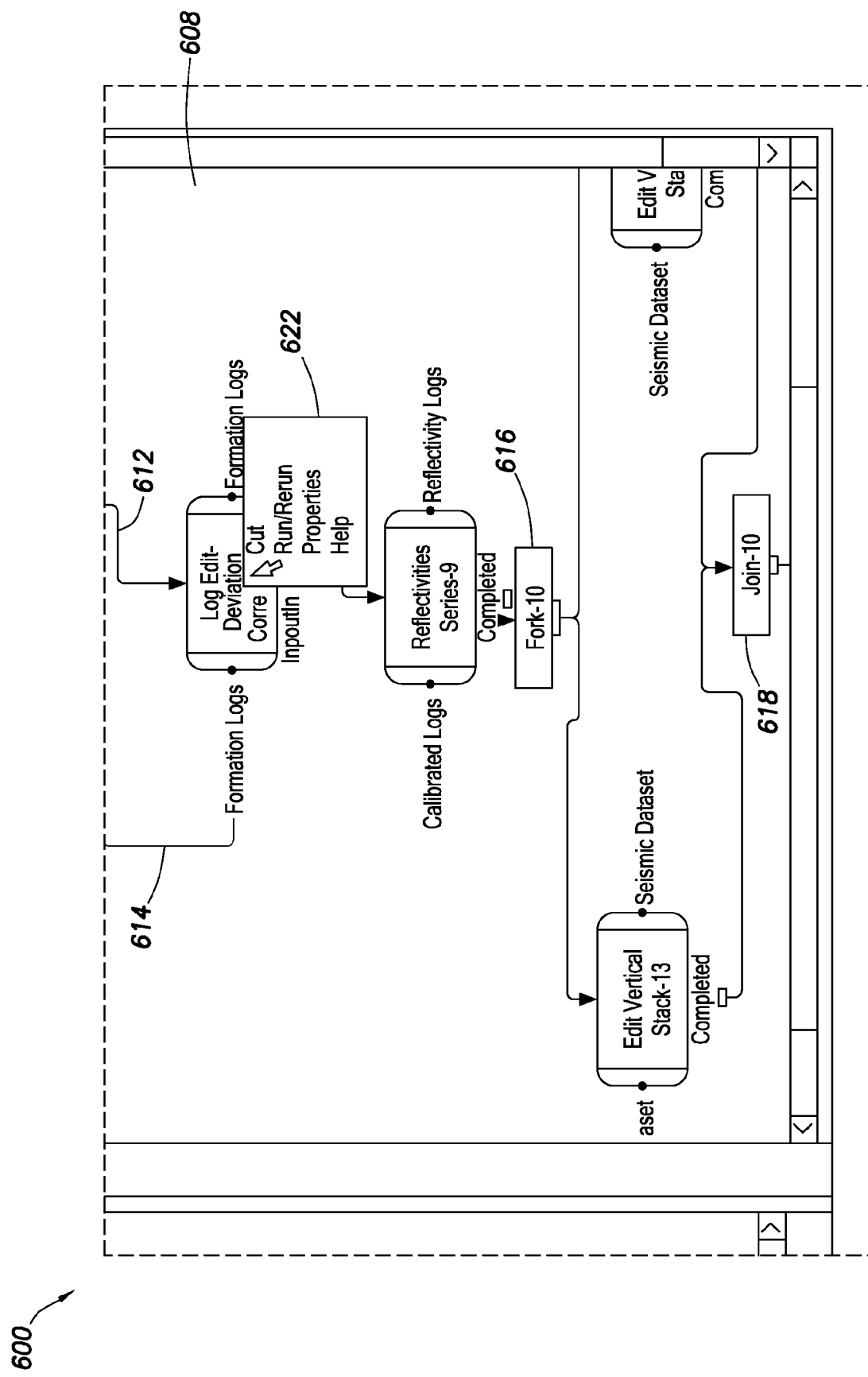
FIG.6B4

OILFIELD MANAGEMENT SYSTEM AND METHOD

CROSS-REFERENCE TO RELATED APPLICATIONS

This application for patent claims priority to, and hereby incorporates by reference, U.S. Provisional Application Ser. No. 60/882,860, entitled "Oilfield Management System and Method," filed Dec. 29, 2006, with the United States Patent and Trademark Office.

BACKGROUND OF THE INVENTION

1. Field of the Invention

The present invention relates to techniques for performing oilfield operations for an oilfield having geological structures and reservoirs therein. More particularly, the invention relates to techniques for collaborating between multiple users to manage such oilfield operations.

2. Background of the Related Art

Oilfield operations involve various sub-surface activities used to locate and gather valuable hydrocarbons. Various tools, such as seismic tools, are often used to locate the hydrocarbons. One or more wellsites may be positioned along an oilfield to locate and gather the hydrocarbons from subterranean reservoirs of an oilfield. The wellsites are provided with tools capable of advancing into the ground and removing hydrocarbons from the subterranean reservoirs. Production facilities are positioned at surface locations to collect the hydrocarbons from the wellsites. Fluid is drawn from the subterranean reservoirs and passed to the production facilities via transport mechanisms, such as tubing. Various equipment is positioned about the oilfield to monitor and manipulate the flow of hydrocarbons from the reservoirs.

During oilfield operations, it is often desirable to monitor various oilfield parameters, such as fluid flow rates, composition, and the like. Sensors may be positioned about the oilfield to collect data relating to the wellsite and the processing facility, among others. For example, sensors in the wellbore may monitor fluid composition, sensors located along the flow path may monitor flow rates and sensors at the processing facility may monitor fluids collected. The monitored data is often used to make real-time decisions at the oilfield. Data collected by these sensors may be further analyzed and processed.

The processed data may be used to determine conditions at the wellsites and/or other portions of the oilfield, and make decisions concerning these activities. Operating parameters, such as wellsite setup, drilling trajectories, flow rates, wellbore pressures, production rates and other parameters, may be adjusted based on the received information. In some cases, known patterns of behavior of various oilfield configurations, geological factors, operating conditions or other parameters may be collected over time to predict future oilfield activities.

Oilfield data is often used to monitor and/or perform various oilfield operations. There are numerous factors that may be considered in operating an oilfield. Thus, the analysis of large quantities of a wide variety of data and management of the oilfield are often complex. Workflows have been developed for the handling and processing such data, as well as documents, tasks, and the like. These workflows are commonly used by oilfield services companies to capture, for example, recovery processes, refining processes, quality control processes, approval process, and the like. For a given process, a workflow defines, among other things, which tasks need to be performed, when the tasks are to be performed, who is to perform the tasks, in what order are they to be performed, how information flows to support the tasks, how the tasks are tracked, and so forth. Historically, workflows were prepared manually using, for example, Microsoft PowerPoint™ and similar presentation tools. These workflows, however, were little more than illustrative guides insofar as each work step contained in the workflow had to be initiated manually by appropriate personnel. The complex process of gathering and interpreting the data required to characterize, model, and design a production regimen for an oilfield requires the execution of several different applications.

More recently, computer-based workflow editors have been developed that allow users to construct a workflow via a graphical user interface and to subsequently execute the workflow. The user simply runs the workflow and each work step contained in the workflow, including the applications associated with, is performed automatically. In these workflow editors, lines were used to represent execution flow, but not data flow, due to the limitations of existing workflow editors. Thus, a user had to choose either an execution flow or a data flow, whichever was most useful for his/her particular application. Unfortunately, such a solution does not readily accommodate certain situations where, for example, a work step is executed multiple times, as in an execution loop, because each work step needs an input from another, specific work step. This led to the imposition of certain rules that were cumbersome to carry out, for example, using lines to represent only execution flow, then using data labels to represent data flow.

In addition, data relating to an oilfield often need to be generated and/or reviewed by users at various locations. Typically, such users perform limited functions and have limited access to specific subsets of data. Furthermore, the users are often unable to communicate with other users, or consider data from other sources.

Thus, despite advances in oilfield and workflow technology, there remains a need to provide techniques for enhancing the performance of oilfield operations. It is desirable that techniques be provided for permitting multiple users to collaborate on workflows, data and oilfield operations. It is further desirable that such users be capable of one or more of the following, among others: providing more effective methods and systems for developing workflows, linking users to enable collaboration therebetween, and providing a workflow editor with a graphical user interface that uses lines to represent both execution flow and data flow.

SUMMARY OF THE INVENTION

Embodiments of the invention provide systems and methods for managing and performing oilfield operations for an oilfield having geological formations and reservoirs therein. The systems and methods provide a graphical user interface that allows a user to graphically define, edit, and automatically run a workflow for managing and performing oilfield operations. Lines are used in the workflow to express both execution flow and data flow. In this way, both execution flow and data flow may be represented in a single workflow diagram. The workflow management systems and methods also allow users to dynamically modify the workflow to add contact information for one or more other users (e.g., domain experts, senior engineers, etc.) to at least one work step. Users may then use the workflow management systems and methods to suspend running of the workflow at any modified work step and request consultation, collaboration, and/or approval from the other users whose contact information was added to that work step.

In at least one aspect, the invention relates to a system for collaboratively managing oilfield operations for an oilfield having geological formations and reservoirs therein. The system comprises a network and a workflow server connected to the network, the workflow server configured to execute a workflow manager, the workflow manager allowing a user to graphically define, edit, and automatically run a workflow for performing oilfield operations. The system further comprises a plurality of user computers connected to the workflow server over the network, each user computer configured to allow a user to access the workflow manager and the workflow. The workflow manager is configured to allow users to collaborate in defining, editing, and running the workflow.

In another aspect, the invention relates to a method of collaboratively managing oilfield operations for an oilfield having geological formations and reservoirs therein. The method comprises providing a workflow manager on a workflow server and allowing users to define, edit, and automatically run a workflow for performing oilfield operations via the workflow manager, the workflow having a plurality of work steps. The method further comprises receiving contact information for one or more users for at least one work step via the workflow manager and sending a request for consultation, collaboration, and/or approval to the one or more users via the workflow manager.

In yet another aspect, the invention relates to a computer-readable medium encoded with computer-readable instructions for allowing users to collaboratively manage oilfield operations for an oilfield having geological formations and reservoirs therein. The computer-readable instructions comprise instructions for causing a computer to execute a workflow manager, the workflow manager configured to allow a user to graphically define, edit, and run a workflow. The computer-readable instructions comprises instructions for causing a computer to allow users to access the workflow manager over a network and to collaborate, via the workflow manager, in defining, editing, and running the workflow.

In still another aspect, the invention relates to an article of manufacture for use in collaboratively managing oilfield operations for an oilfield having geological formations and reservoirs therein. The article of manufacture comprises a processor and a computer-readable medium connected to the processor. The computer-readable medium is encoded with computer-readable instructions for causing the processor to present a workflow to a user and allow the user to define, edit, and automatically run the workflow, the workflow having a plurality of work steps for performing oilfield operations. The computer-readable instructions further cause the processor receive contact information for one or more contacts from the user for a given work step and send a request to the one or more contacts to consult, collaborate, and/or provide approval for the given work step.

BRIEF DESCRIPTION OF THE DRAWINGS

So that the above recited features and advantages of the invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

FIG. 4 illustrates an example of a system for managing a workflow according to preferred embodiments of the invention.

FIG. 5 illustrates an example of a workflow server for managing a workflow according to preferred embodiments of the invention;

FIGS. 6A, 6A1-A4, 6B, and 6B1-B4 illustrate an example of a graphical user interface for a workflow manager according to preferred embodiments of the invention.

DETAILED DESCRIPTION OF THE DRAWINGS

In the following detailed description of a preferred embodiment and other embodiments of the invention, reference is made to the accompanying drawings. It is to be understood that those of skill in the art will readily see that other embodiments and changes may be made without departing from the scope of the invention.

Figure 1:
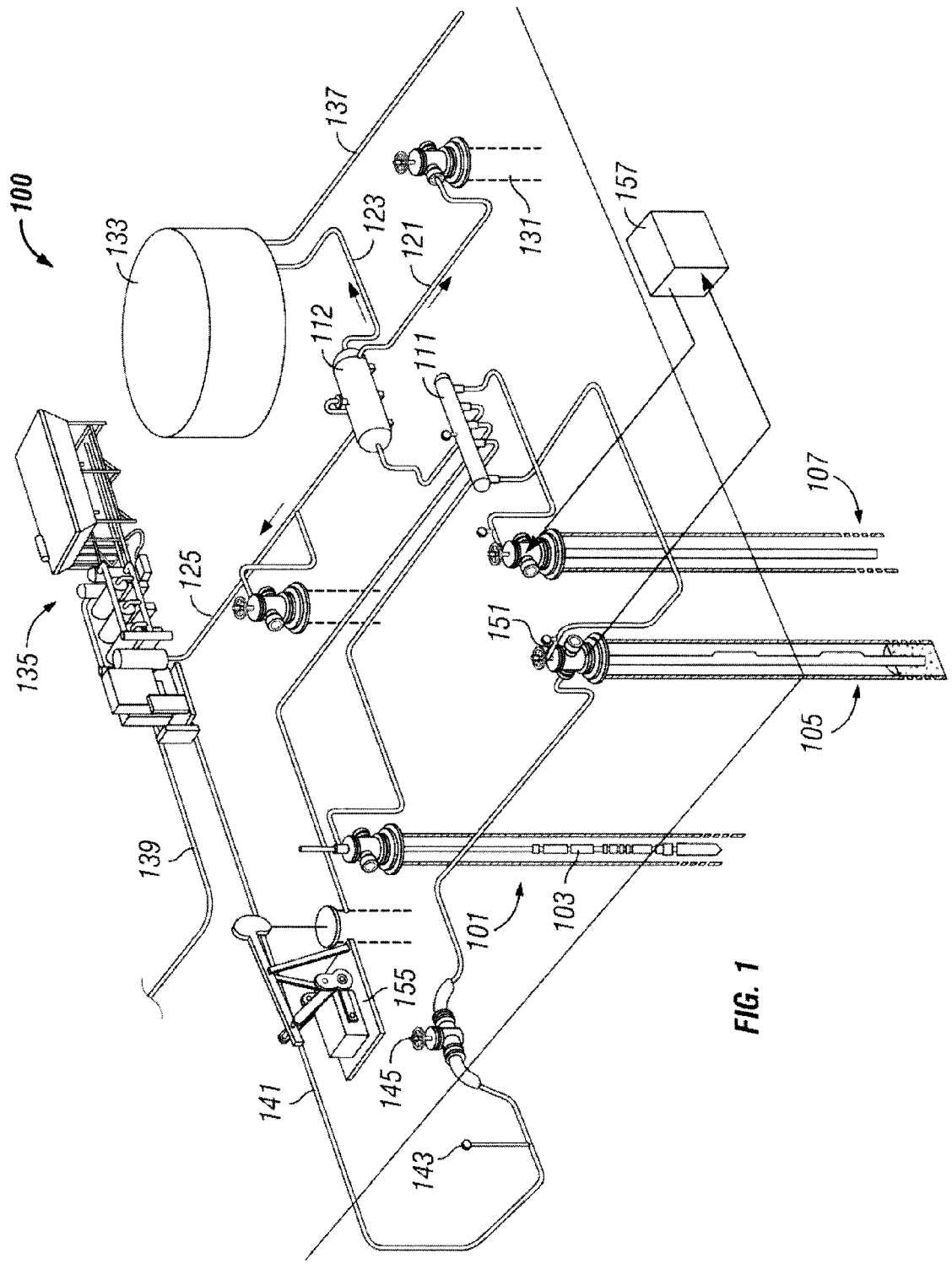
FIG. 1 illustrates an example of an oilfield from which various types of data may be acquired.

Turning to FIG. 1, an oilfield 100 is depicted having machinery used to extract hydrocarbons, such as oil and gas, from downhole formations. An operations control center 157 may assist in collecting data and making decisions to enhance operations in the oilfield. Data such as measurements of bottom hole pressure and tubing head pressure may be gathered from the oilfield and analyzed.

As shown in FIG. 1, the oilfield 100 includes a number of wells. Specifically, the oilfield 100 includes a first producing well 101 that uses an electric submersible pump 103 to produce a hydrocarbon (e.g., oil, gas, etc.), a second well 105 that relies on a gas lift to produce a hydrocarbon, and a third well 107 that relies on natural flow to produce a hydrocarbon. First producing well 101, second well 105, and third well 107 deliver production fluids (e.g., hydrocarbon) produced from their respective wells to a production manifold 111. The production manifold 111 collects multiple streams and outputs the streams to a gas and oil separator 112.

Upon receipt of the production fluids by the gas and oil separator 112, the gas and oil separator 112 separates various components from the fluids, such as produced water 121, produced oil 123, and produced gas 125, respectively, to water disposal well 131, oil storage 133, and a compressor station 135. Oil storage 133 may transfer oil via an oil export pipeline 137. Similarly, the compressor station 135 may use gas export pipeline 139 to transfer gas. Finally, the compressor station 135 may process gas as an injection gas 141.

In order to adjust pressure on the injection gas, a meter and control system 143 may cooperate with an injection-gas manifold 145. The operation of the meter and control system 143 may regulate pressure of the injection gas as the injection gas is delivered to a wellhead tubing and casing 151. In addition to the injection gas, extracting efforts may rely upon a rod pump 155 to drive a downhole pump assembly via a reciprocating motion. In such cases, the rod pump 155 propels hydrocarbons to the production manifold 111.

In one example, the operations control center 157 may receive data from sensors positioned throughout the oilfield 100. Examples of sensors are depicted and described in further detail with respect to FIG. 2 and described further below. The operations control center 157 may also operate and/or control equipment in the third well 107.

Figure 2:
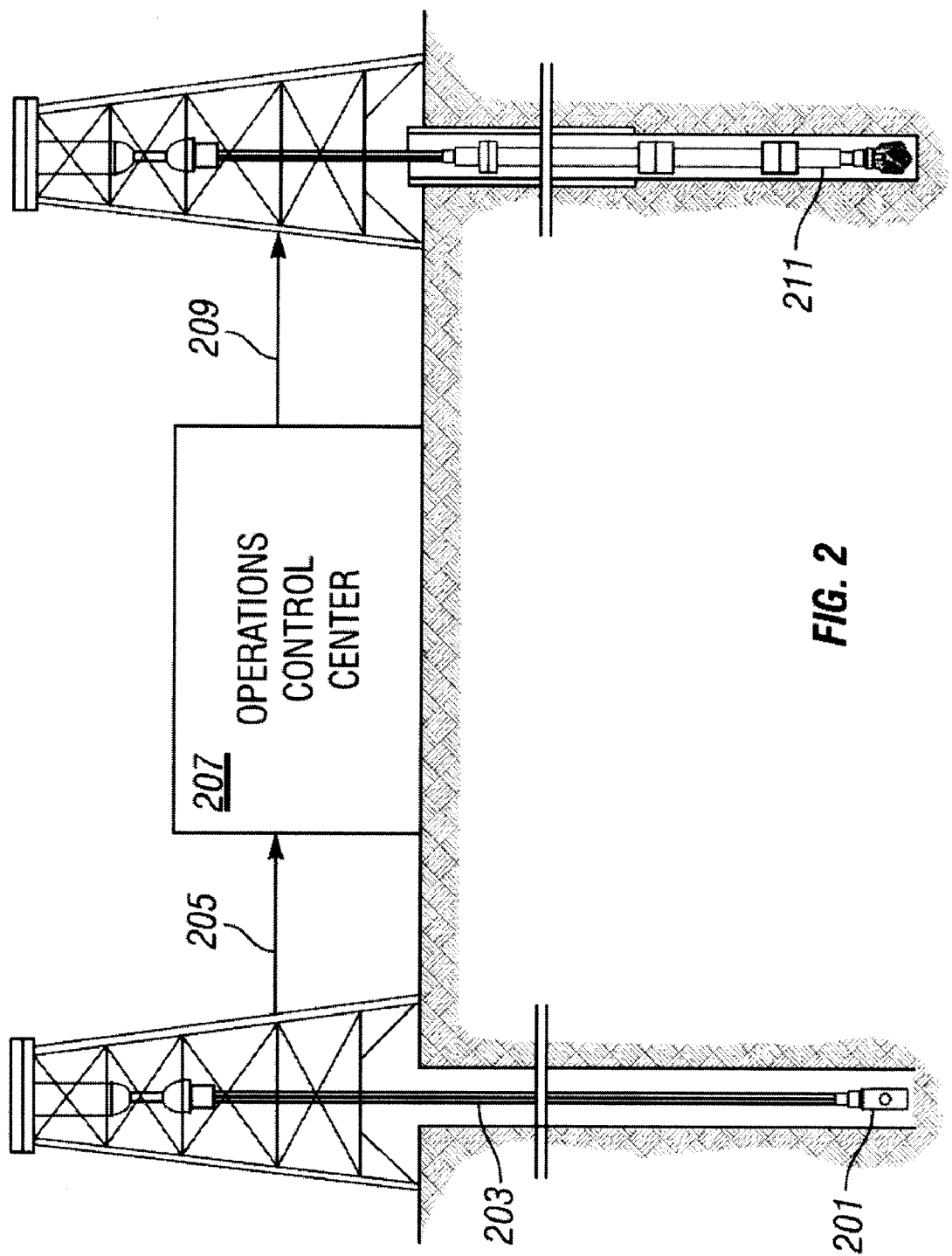
FIG. 2 illustrates a portion of a wellbore operation, such as the wellbore operation shown in FIG. 1.

FIG. 2 shows a portion of the wellbore operation, such as the wellbore operation of FIG. 1, in greater detail. This diagram depicts the cooperation of an operations control center 207 with at least two wells. As discussed above, one purpose of the operations control center 207 is to collect data and control a drilling operation. The down-hole sensors 201 and well-head sensors 203 provide data (i.e., data collected and/or otherwise obtained from the down-hole sensors 201 and/or the well-head sensors 203). Upon receipt of the information, a first communication link 205 transfers the aforementioned data to the operations control center 207. Data may also be collected from other sources, and/or sent to other sites not depicted. Such data may be historical, real time, or stored data.

The operations control center 207 stores and, in some cases, optionally processes and/or analyzes the data. In some cases, the operations control center 207 may also generate and transmit control signals via the second communication link 209 to a down-hole apparatus 211. For example, the operations control center 207 may automatically generate control signals using data obtained via the communications link 205. In another example, the operations control center 207 may provide information to an operator that may consider the information, and then send control signals as desired. In addition, the operations control center 207 may also provide feedback to the down-hole sensors 201 and/or the well-head sensors 203 using data obtained via the communications link 205. Historical, real time, or stored data may also be processed and analyzed off-site.

As can be seen, the analysis of large quantities of a wide variety of data and management of an oilfield are often complex. Workflows may be developed for the handling and processing of such oilfield data, as well as various documents, tasks, and the like. Embodiments of the invention provide systems and methods for managing such workflows. The workflow management systems and methods of the invention provide a graphical user interface that allows a user to graphically define, edit, and automatically run a workflow. In preferred embodiments, the workflow may be represented using lines to express both execution flow and data flow. This allows both execution flow and data flow to be represented in a single workflow diagram. In addition, the workflow management systems and methods of the invention allow users to dynamically modify the workflow to add contact information for one or more contacts (e.g., domain expert, senior engineer, etc.) to at least one work step. Users may then use the workflow management systems and methods to suspend running of the workflow, if needed, at any modified work step and request consultation, collaboration, and/or communication with the contacts associated with that work step.

Figure 3A:
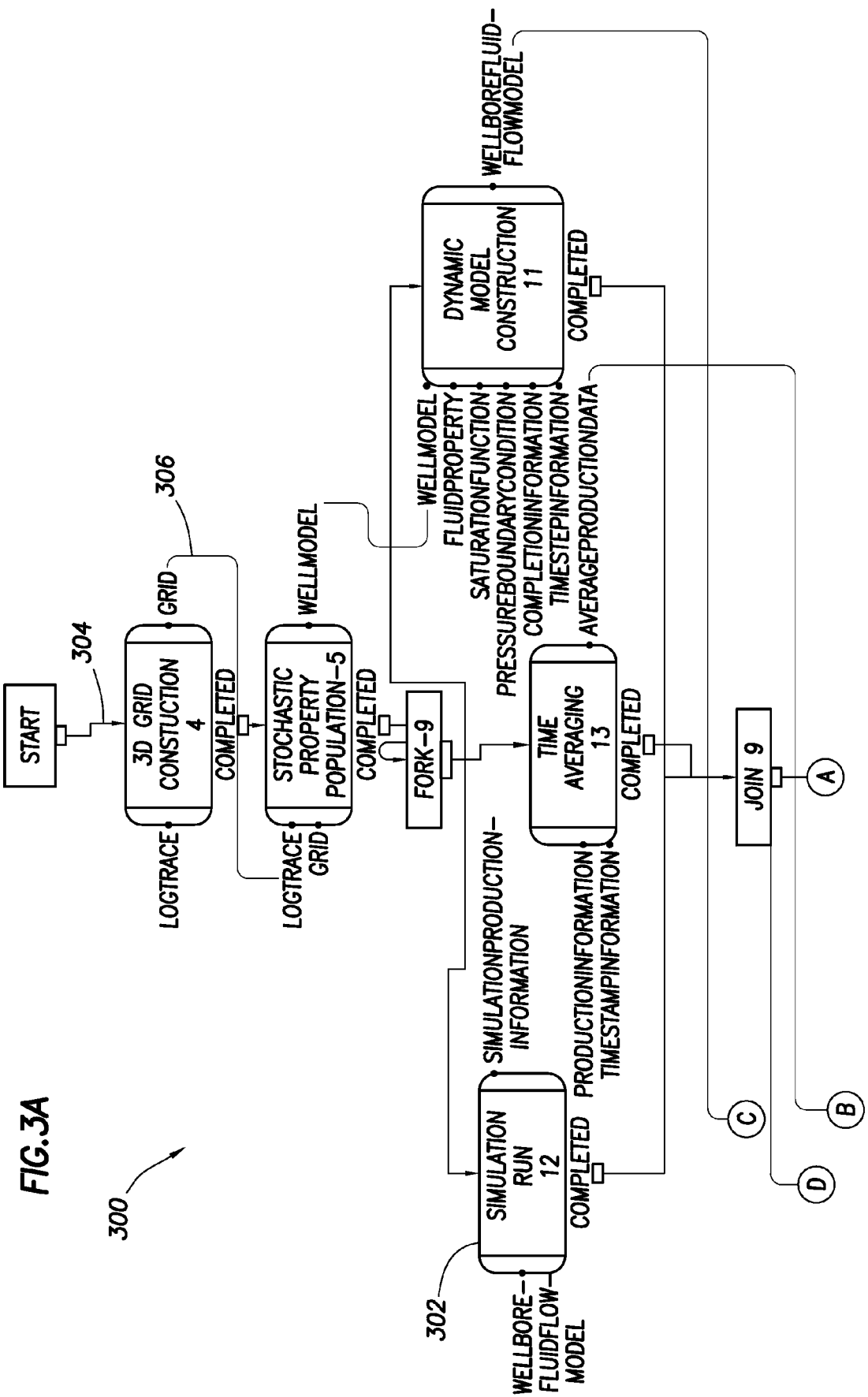
FIGS. 3A-3B illustrate an example of a workflow according to preferred embodiments of the invention.
Figure 3B:
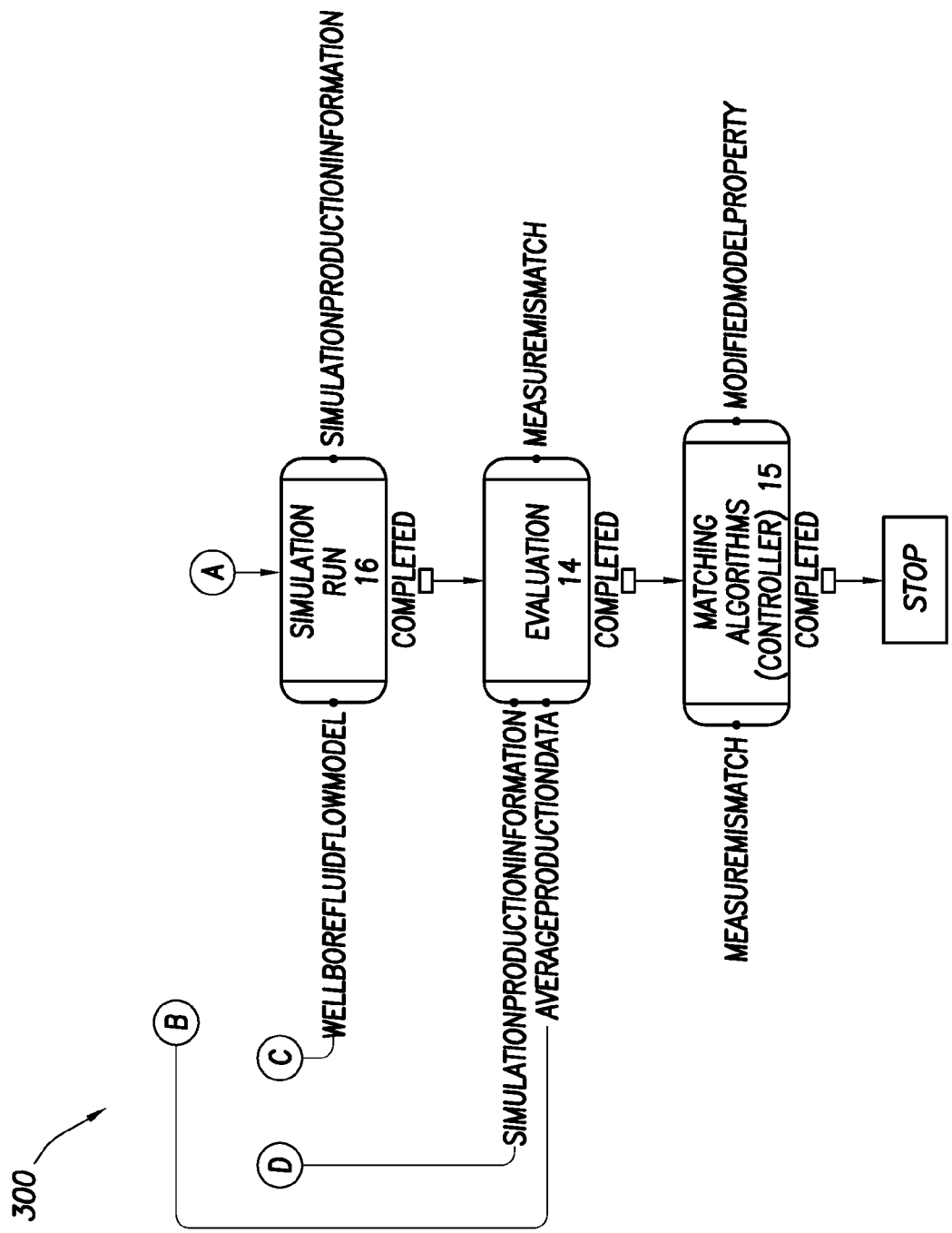

Referring now to FIGS. 3A-3B, an example of a workflow 300 usable for performing wellbore operations, such as those depicted in FIGS. 1 and 2, is shown. As can be seen, the workflow 300 comprises a series of work steps 302 that are interconnected to one another. Each work step 302 performs, or is configured to launch an application (e.g., MathCAD™) that performs, a certain function within the workflow 300. In the specific example shown, the workflow 300 has been defined to characterize, model, and design a production regimen for an oilfield. Those having ordinary skill in the art will understand, however, that similar workflows may be defined for other, non-oilfield industries without departing from the scope of the invention.

In some cases, the work steps 302 may be selected from a predefined set or collection of work steps 302. These work steps 302 typically comprise application programming interfaces (API) that can be used by oilfield service companies and other companies to build various applications, such as data interpretation and processing applications. An example of a predefined set or collection of application programming interfaces that may be used for the oilfield industry is Ocean Framework™ available from Schlumberger Information Services of Houston, Tex. The workflow 300 may then be run to cause each work step 302 to automatically perform its specific tasks.

In some cases, both data flow and execution flow are expressed in the workflow 300 without restricting execution flow based on data flow considerations. In one example, rectangles are used to represent the work steps 302, with specific sides of the rectangles being pre-designated for data flow versus execution flow. In the workflow 300 of FIGS. 3A-3B, for example, the left side of the rectangles is designated for data inputs, the right side for data outputs, the top side for previous execution steps, and the bottom for subsequent execution steps. In this way, vertically flowing lines 304 may be used to represent execution flow while horizontally flowing lines 306 may be used to represent data flow. Of course, other shapes besides a rectangle (e.g., circle, diamond, etc.) and other flow directions besides the left-to-right and top-to-bottom may also be used without departing from the scope of the invention.

FIG. 4 illustrates an exemplary system 400 for managing a workflow, such as the workflow 300 of FIGS. 3A-3B, according to preferred embodiments of the invention. As can be seen, the workflow management system 400 comprises a plurality of remotely located users, represented here by computers 402a, 402b, 402c, and 402d, that are connected to at least one workflow server 404 over a network connection 406. The network connection 406 may be any suitable network connection known to those having ordinary skill in the art, including a wired network connection as well as a wireless network connection. In some cases, the workflow server 402 is a Web server that has a workflow manager stored thereon (discussed more fully with respect to FIG. 5). The workflow server 404 is configured to execute the workflow manager and to store any workflows generated by the workflow manager on the workflow server 404 as needed. Users 402a-d may then access the workflow server 404 to consult, collaborate, and/or communicate with one another in order to define, edit, and run the various workflows.

In operation, a user (e.g., oilfield engineer, etc.) may dynamically enter contact information for one or more other users (e.g., domain expert, senior engineer, etc.) to at least one work step of a workflow via the workflow server 402. This means that the workflow manager allows the requesting user to simply enter the contact information into the work steps of an existing workflow without having to modify any programming codes or scripts underlying the work steps or the workflow. Thereafter, the requesting user may instruct the workflow manager to suspend running of the workflow (if needed) at the modified work step and request consultation, collaboration, and/or approval (including signoff) from other users (e.g., domain expert, senior engineer, etc.) as needed. The workflow manager thereafter sends an appropriate message to the other users (e.g., domain expert, senior engineer, etc.) along with any information needed to access the particular workflow and work steps (e.g., a URL). The message may be sent in real time while the workflow is running, or while the workflow is suspended, and it may be sent using any suitable medium known to those having ordinary skill in the art (e.g., cell phone message, text message, voice message, email, page, etc.). The workflow manager may also automatically enter the request on the requested users' electronic task list, including any deadlines and priority levels associated with the request.

When the requested users receives the request, they may access the workflow and the data produced therefrom by logging on to the workflow server 404 (e.g., via an appropriate URL). After they validate their credentials from their computing platform (e.g., PDA, laptop, smart phone, etc.), the requested users may be allowed to access the workflow. Once validated, the workflow manager allows the requested users to see the entire workflow (i.e., not just the specific work steps or a portion of the workflow). The requested users may also perform any suitable operation on the workflow, such as examining the data, re-running a particular work step, adding a work step to the workflow, and/or sending a recommendation back to the requesting user. During this time, the requested users has the option to check out and/or lock the workflow while working on it. When the requested users are finished with the workflow, the workflow manager releases the lock and saves the modifications (if any) along with any data generated. The workflow manager may thereafter send a message to the requesting user informing him/her of the recommendations and changes made by the requested users.

FIG. 5 illustrates an example of the workflow server 404 of FIG. 4 in more detail. As can be seen, the workflow server 404 may be, among other things, a personal computer (PC), a server (e.g., a Web server), a workstation (e.g., a Sun Microsystems workstation), two or more networked workstations, a mainframe computer, and the like. In the example shown, the workflow server 404 has a number of functional components, including at least one processor 502, an input/output (I/O) unit 504, a system bus 506, and a computer-readable memory 508. A network 510 connects the workflow server 404 to other networks, systems, databases, computers, and the like. These components of the workflow server 404 are generally well known to those having ordinary skill in the art and therefore will not be described in great detail here. Furthermore, although multiple discrete components are shown in FIG. 5, those having ordinary skill in the art will understand that two or more of these components may be combined into a single component, and that a single component may be divided into several sub-components, as needed.

Briefly, the processor 502 is responsible for the overall operation of the workflow server 404, including executing of the operating system software and any other software applications that may be present on the workflow server 404. The I/O unit 504 controls the flow of data into and out of the workflow server 404, for example, through various media reader devices and output devices. The system bus 506 allows the various functional components of the workflow server 404 to communicate and exchange data with one another. The computer-readable memory 508, which may be a magnetic, optical, and/or semiconductor memory, provides temporary and long-term storage for any information or data needed by the operating system and applications running on the workflow server 404. Finally, the network 510 may be an Ethernet-based wired and/or wireless network for connecting the workflow server 404 to other networks, systems, databases, and the like.

In accordance with preferred embodiments, a workflow manager 512 may be stored in the computer-readable memory 508 for performing the various workflow functions described above with respect to FIG. 4. For example, the workflow manager 512 may provide a graphical user interface that allows the user to graphically define, edit, and run the workflow. In addition, the graphical user interface may use lines to express both execution flow and data flow. This makes it possible to represent both execution flow and data flow in a single workflow diagram. The graphical user interface may display a variety of user-selectable views to facilitate visualization of the workflow. For example, the graphical user interface may show both data flow and execution flow lines, show only data flow lines, show only execution flow lines, show data flow lines as solid lines on top and execution flow lines as shadow lines on the background, and show execution flow lines as solid lines on top and data flow lines as shadows in the background. Color, line width, and line patterns, may also be used to distinguish between data flow lines and execution flow lines. Furthermore, the workflow manager 512 allows users to dynamically modify a workflow to add contact information for one or more other users (e.g., domain expert, senior engineer, etc.) to at least one work step. Users may then instruct the workflow manager 512 to suspend running of the workflow if needed at any modified work step and request consultation, collaboration, and/or approval (including signoff) from the other users associated with that work step.

FIGS. 6A, 6A1-A4, 6B, and 6B1-B4 illustrate an example of a graphical user interface 600 that may be provided by the workflow manager 512. Referring to FIGS. 6A and 6A1-A4, in preferred embodiments, the graphical user interface 600 of the workflow manager 512 may display a series of panels, including a data selection panel 602, a workflow tree panel 604, a work step selection panel 606, and a workflow diagram panel 608. The data selection panel 602 displays various types of data that may be used in the workflow, such as well log data, seismic data, simulation data, and the like. The workflow tree panel 604 is essentially a view of the workflow diagram panel 608 in tree form instead of diagram form. The work step selection panel 606 displays various types of work steps that may be used in the workflow, such as those available from Ocean Framework™ mentioned above. Other panels besides those shown may certainly be included in the graphical user interface 600 as needed, or one or more panels 602-608 may be removed from the graphical user interface 600, without departing from the scope of the invention.

In operation, a user may define a workflow 610 by clicking and dragging one or more work steps 612 from the work step selection panel 606 and dropping the selected work steps 612 into the workflow diagram panel 608. As work steps 612 are added to the workflow diagram panel 608, these work steps 612 are automatically updated in the workflow tree shown in the workflow tree panel 604. When dropped into the workflow diagram panel 608, each work step 612 is represented as a rectangle that includes one or more handles. In one example, data handles are on the left and right sides of the rectangle and represent data inputs and outputs, respectively, while execution handles are on the top and bottom of the rectangle and represent previous and subsequent execution steps, respectively. The number and type of data handles available with each work step 612 depends on the particular function or task performed by that work step 612. Conversely, every work step 612 has only one previous execution handle and one subsequent execution handle.

FIGS. 6B and 6B1-B4 illustrate a more developed version of the workflow 610. As can be seen, several work steps 612 have now been connected to each other by their execution handles and data handles. The connection between the execution handles is represented by vertically flowing lines 612, whereas the connection between the data handles is represented by horizontally flowing lines 614. In one example, connecting of the various handles to each other may be accomplished by dragging, respectively, the execution or data handles of one work step 612 to the execution or data handles of another work step 612. In addition, or alternatively, the various handles may be automatically connected (i.e., snapped together) simply by bringing the handles of the work steps 612 in close proximity to one another. Of course, execution handles may not be connected to data handles, or vice versa. Similarly, data handles that represent disparate types of data (e.g., seismic data versus porosity data) may not be connected together.

In accordance with preferred embodiments, users may dynamically modify the workflow 610 at any time to add contact information for one or more other users (e.g., domain expert, senior engineer, etc.) to at least one work step 612. Such contact information may include, for example, email addresses, telephone numbers, page numbers, fax numbers, and the like. The users may simply enter the contact information into the work steps of the workflow 610 without having to modify any programming codes or scripts underlying the work steps or the workflow 610. Such information entry may be effected using any technique known to those having ordinary skill in the art, including a menu option, popup dialogue box, hot key, and the like. Moreover, in some implementations, certain work steps may have a pre-assigned list of domain experts, senior engineers, and the like that may be displayed, and the users may simply select one or more such domain experts, senior engineers, and the like for consultation, collaboration, and/or approval (including signoff).

Once the workflow 610 is completed, or at any time beforehand, the user may run the workflow 610 by clicking an appropriate button 620. The workflow manager 512 thereafter automatically executes each work step 612, or executes an application associated with the work step 612, according to its position in the workflow 610. Fork blocks 616 and join blocks 618 allow the user to define parallel execution flows for work steps 612 that are to be performed in parallel. Any individual work step 612 may also be executed in isolation. For example, by right-clicking on a work step 612, the user may bring up a dialog box 622 containing a number of options that may be selected, including an option to run or rerun the work step 612. Furthermore, the user may also suspend running of any work step 612 at any time and cause the workflow manager 512 to send a request for consultation, collaboration, and/or approval (including signoff) to one or more other users. In some examples, an activities panel 624 displays status information for each work step 612, including whether the work step 612 has been suspended, completed (e.g., by using a checkmark indicator), the time and date it was suspended or completed, and so forth.

In some embodiments, as the user is defining the graphical representation of the workflow 610 in the workflow diagram panel 608, the workflow manager 512 may also generate a text-based or script-based representation of the workflow 610. Such a text-based or script-based representation may express the execution flow as a series of steps, while data flow may be represented by using data labels as the inputs and outputs for each step in the script.

Figure 7:
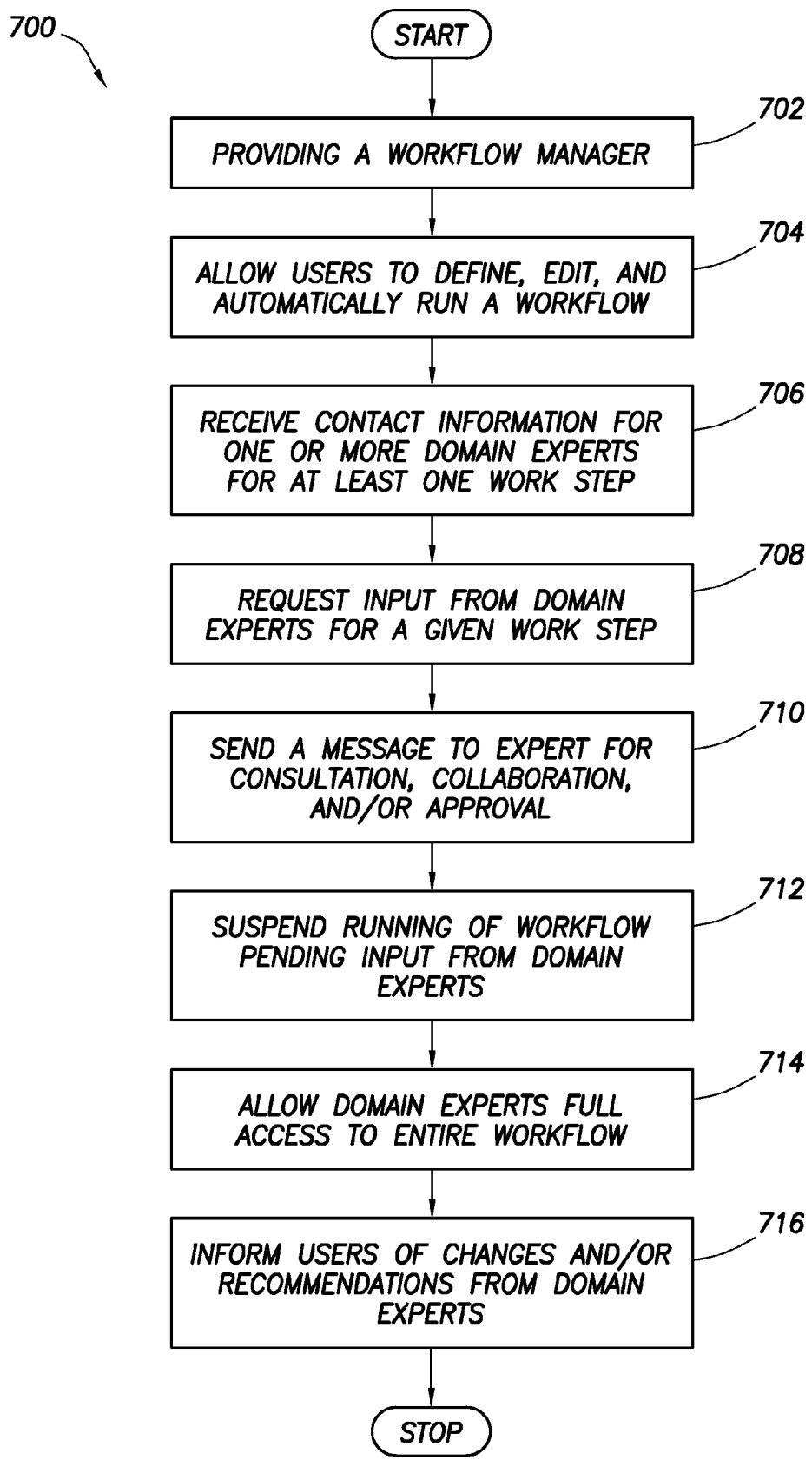
FIG. 7 illustrates an example of a method for managing a workflow according to preferred embodiments of the invention.

FIG. 7 illustrates a method 700 that may be used to manage a workflow according to preferred embodiments. Note that although the method 700 is shown in terms of a series of discrete steps, those having ordinary skill in the art will understand that two or more steps may be combined into a single step, and that any single step may be divided into several constituent steps, without departing from the scope of the invention. Similarly, although the steps of the method 700 are shown in a particular sequence, those having ordinary skill in the art will recognize that a different sequence may certainly be used. Furthermore, one or more steps may be deleted from or added to the method 700 without departing from the scope of the invention.

The method 700 begins at step 702, where a workflow manager much like the workflow manager 512 of FIG. 5 is provided, for example on a workflow server much like the workflow server 404 of FIG. 4. At step 704, users are allowed to use the workflow manager, or rather the graphical user interface thereof, to define, edit, and automatically run a workflow, including a plurality of work steps. At any time, contact information may be received from the users for one or more domain experts, senior engineers, and the like, at step 706. Once the workflow is completed, or any time beforehand, the users may request consultation, collaboration, and/or approval (including signoff) from domain experts, senior engineers, and the like, at step 708. At step 710, an electronic message is sent by the workflow manager to the domain experts, senior engineers, and the like, requesting the consultation, collaboration, and/or approval (including signoff). During this time, the users have the option of suspending the work step for which consultation, collaboration, and/or approval (including signoff) was requested pending input from the domain experts, senior engineers, and the like at step 712. The domain experts, senior engineers, and the like, may thereafter access the entire workflow to review the data, re-running a particular work step, adding a work step to the workflow, and/or sending a recommendation back to the user at step 714. At step 716, the user is informed of the changes to the workflow and/or recommendations from the domain experts, senior engineers, and the like.

The foregoing description is provided for purposes of illustrating, explaining and describing certain aspects of the invention in particular detail. Other aspects besides the ones described herein may exist and/or be developed. Thus, those having ordinary skill in the art will understand that modifications and adaptations to the described methods, systems and other embodiments may be made without departing from the scope or spirit of the invention.

What is claimed is:

1. A system for collaboratively managing oilfield operations for an oilfield having geological formations and reservoirs therein, comprising:
    a network;
    a workflow server connected to the network, the workflow server configured to execute a workflow manager comprising functionality to:
        present, to a user, a graphical user interface (GUI) configured to generate a workflow for performing oilfield operations, wherein the GUI comprises a workflow diagram panel;
        receive a plurality of work steps selected by the user;
        generate, in the workflow diagram panel, a workflow diagram interconnecting the plurality of work steps;
        receive activation from the user to execute the workflow;
        receive, in the workflow diagram panel and during execution of the workflow, contact information for one or more other users from the user for a work step of the plurality of work steps;
        send, using the contact information and in response to execution of the workflow reaching the work step, a request to the one or more other users to provide input for the work step along with information needed to access the work step, including a Uniform Resource Locator (URL);
        receive the input from the one or more other users to add another work step in the workflow diagram panel;
        lock, in response to the input, the workflow for modification by the one or more other users while adding the another work step to the workflow; and inform the user of changes made by the one or more other users; and a plurality of computers configured to connect to the workflow server over the network and configured to:
access the workflow manager and the workflow.

2. The system of claim 1, wherein the workflow manager further comprises functionality to receive instruction from the user to select the one or more other users from a predefined list generated based on the work step.

3. The system of claim 1, wherein the request comprises an electronic message containing information regarding the work step.

4. The system of claim 1, wherein the workflow manager further comprises functionality to suspend the work step while waiting for the one or more other users to respond to the request.

5. The system of claim 1, wherein the workflow manager further comprises functionality to lock the workflow upon validation of the one or more other users by the workflow server and to subsequently unlock the workflow.

6. The system of claim 1, wherein the workflow manager further comprises functionality to provide the one or more other users access to all work steps in the workflow.

7. The system of claim 1, wherein the workflow manager further comprises functionality to interconnect the plurality of work steps by vertically flowing lines and horizontally flowing lines, the vertically flowing lines representing execution flow and the horizontally flowing lines representing data flow.

8. A method of collaboratively managing oilfield operations for an oilfield having geological formations and reservoirs therein, comprising:
presenting, to a user, a graphical user interface (GUI) configured to generate a workflow for performing the oilfield operations, wherein the GUI comprises a workflow diagram panel;
receiving a plurality of work steps selected by the user;
generating, in the workflow diagram panel of a workflow manager executing on a workflow server, a workflow diagram interconnecting the plurality of work steps;
receiving activation from the user to execute the workflow;
receiving, from the user in the workflow diagram panel and during execution of the workflow, contact information for one or more other users for a work step of the plurality of work steps;
sending, using the contact information and in response to execution of the workflow reaching the work step, a request to the one or more other users to provide input for the work step along with information needed to access the work step, including a Uniform Resource Locator (URL);
receiving the input from the one or more other users to add another work step in the workflow diagram panel;
locking, in response to the input, the workflow for modification by the one or more other users while adding the another work step to the workflow; and
informing the user of changes made by the one or more other users.

9. The method of claim 8, further comprising receiving instruction from the user to select the one or more other users from a predefined list generated based on the work step.

10. The method of claim 8, wherein the request is an electronic message containing information regarding the work step.

11. The method of claim 8, further comprising suspending the work step while waiting for the one or more other users to respond to the request.

12. The method of claim 8, further comprising locking the workflow upon validation of the one or more other users and subsequently unlocking the workflow.

13. The method of claim 8, further comprising providing the one or more other users access to all work steps in the workflow.

14. A non-transitory computer-readable medium encoded with computer-readable instructions for allowing users to collaboratively manage oilfield operations for an oilfield having geological formations and reservoirs therein, the computer-readable instructions comprising instructions for causing a computer to:
present, to a user, a graphical user interface (GUI) configured to generate a workflow for performing the oilfield operations, wherein the GUI comprises a workflow diagram panel;
receive a plurality of work steps selected by the user;
generate, in the workflow diagram panel, a workflow diagram interconnecting the plurality of work steps;
receive activation from the user to execute the workflow;
receive, in the workflow diagram panel and during execution of the workflow, contact information for one or more other users from the user for a work step of the plurality of work steps;
send, using the contact information and in response to execution of the workflow reaching the work step, a request to the one or more other users to provide input for the work step along with information needed to access the work step, including a Uniform Resource Locator (URL);
receive the input from the one or more other users to add another work step in the workflow diagram panel;
lock, in response to the input, the workflow for modification by the one or more other users while adding the another work step to the workflow; and
inform the user of changes made by the one or more other users.

15. The non-transitory computer-readable medium of claim 14, wherein the computer-readable instructions further comprise instructions for causing the computer to receive instruction from the user to select the one or more other users from a predefined list generated based on the work step.

16. The non-transitory computer-readable medium of claim 14, wherein the request comprises an electronic message containing information regarding the work step.

17. The non-transitory computer-readable medium of claim 14, wherein the computer-readable instructions further comprise instructions for causing the computer to suspend the work step while waiting for the one or more other users to respond to the request.

18. The non-transitory computer-readable medium of claim 14, wherein the computer-readable instructions further comprise instructions for causing the computer to lock the workflow upon validation of the one or more other users and to subsequently unlock the workflow.

19. The non-transitory computer-readable medium of claim 14, wherein the computer-readable instructions further comprise instructions for causing the computer to provide the one or more other users access to all work steps in the workflow.

20. An article of manufacture for use in collaboratively managing oilfield operations for an oilfield having geological formations and reservoirs therein, comprising:
a processor; and
memory operatively connected to the processor and comprising instructions for causing the processor to:

present, to a user, a graphical user interface (GUI) configured to generate a workflow for performing the oilfield operations, wherein the GUI comprises a workflow diagram panel;

receive a plurality of work steps selected by the user;

generate, in the workflow diagram panel, a workflow diagram interconnecting the plurality of work steps;

receive activation from the user to execute the workflow;

receive, in the workflow diagram panel and during execution of the workflow, contact information for one or more other users from the user for a work step of the plurality of work steps;

send, using the contact information and in response to execution of the workflow reaching the work step, a request to the one or more other users to provide input for the work step along with information needed to access the work step, including a Uniform Resource Locator (URL);

receive the input from the one or more other users to add another work step in the workflow diagram panel;

lock, in response to the input, the workflow for modification by the one or more other users while adding the another work step to the workflow; and inform the user of changes made by the one or more other users.

21. The article of manufacture of claim 20, wherein the one or more other users are selected from a predefined list for the work step.

22. The article of manufacture of claim 20, wherein the request is an electronic message containing information regarding the work step.

23. The article of manufacture of claim 20, wherein the instructions further cause the processor to suspend the work step while waiting for the one or more other users to respond to the request.

24. The article of manufacture of claim 20, wherein the instructions further cause the processor to lock the workflow upon validation of the one or more other users and to subsequently unlock the workflow.

25. The article of manufacture of claim 20, wherein the instructions further cause the processor to provide the one or more other users access to all work steps in the workflow.

* * * * *